Feb. 11, 1969 H. DEPLANTE 3,426,983
CONTROL TRANSMISSION DEVICE FOR VARIABLE-GEOMETRY AIRCRAFT
Filed Nov. 1, 1967 Sheet 1 of 3
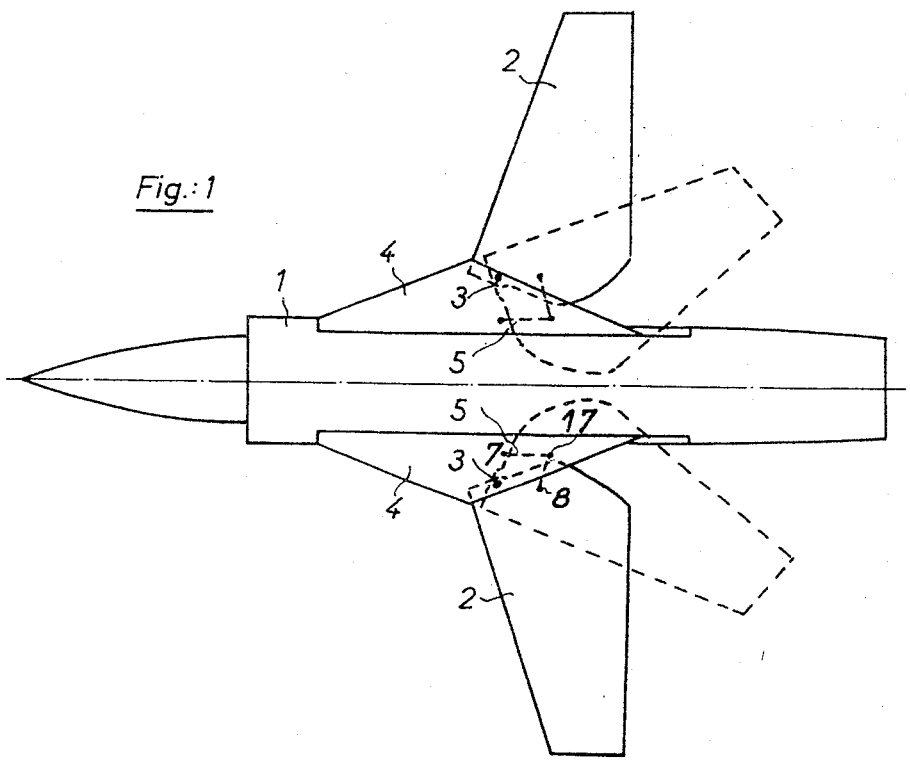
Fig.:1

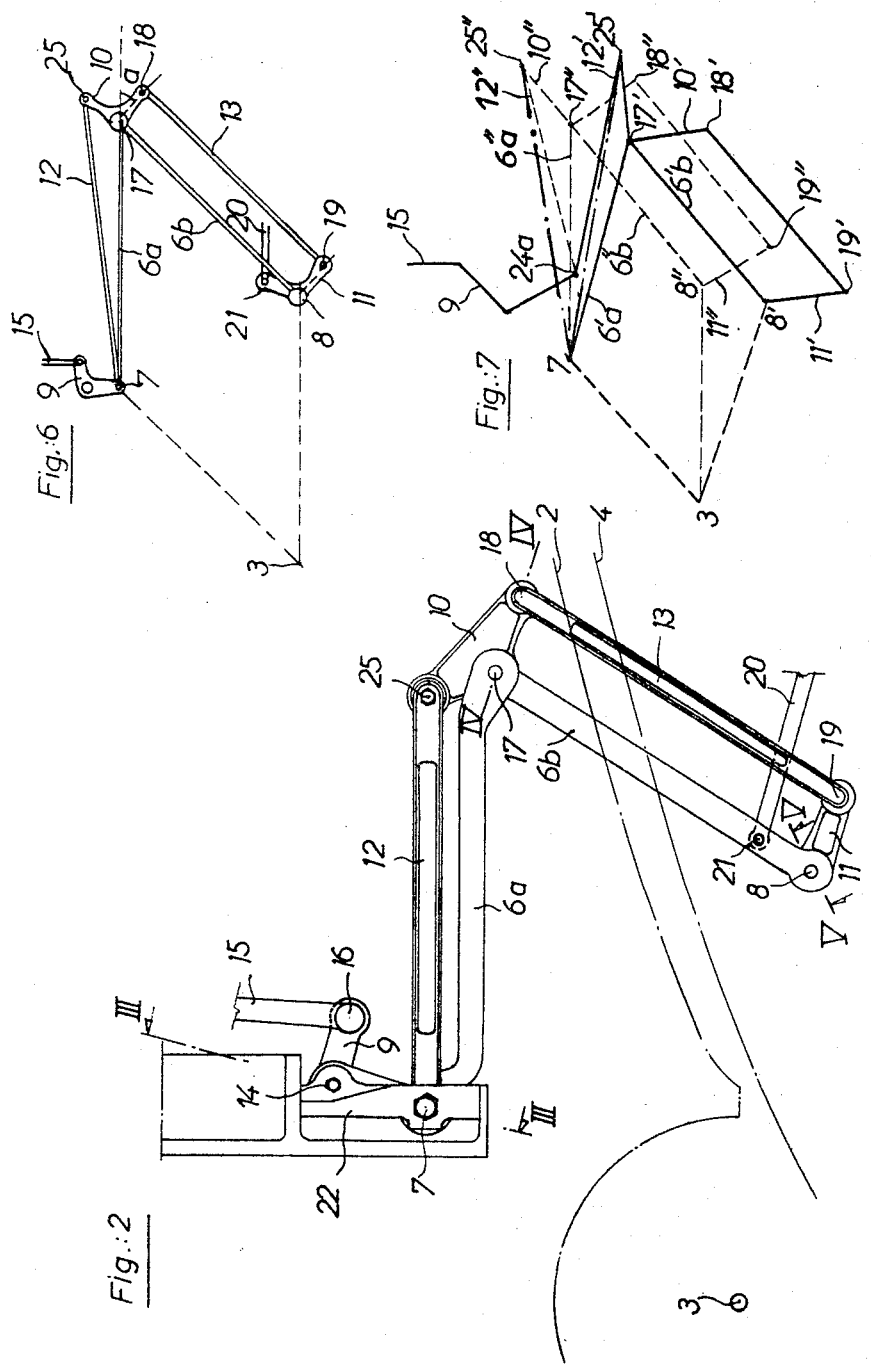

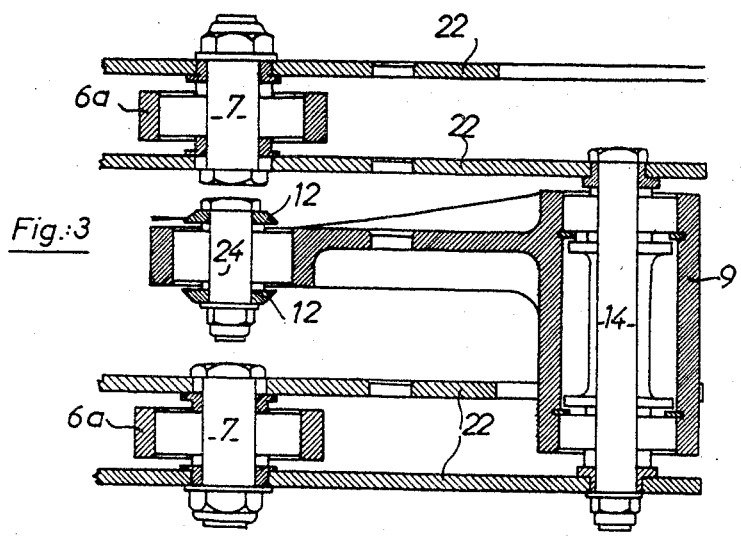
Fig.:3
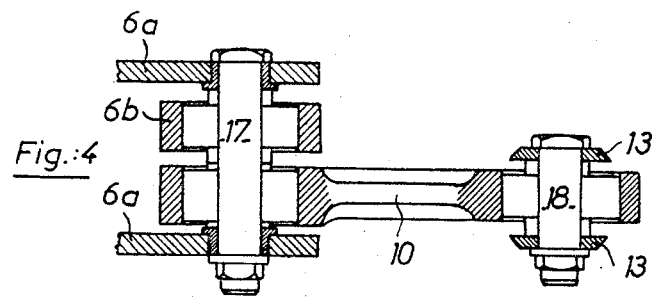
Fig.:4
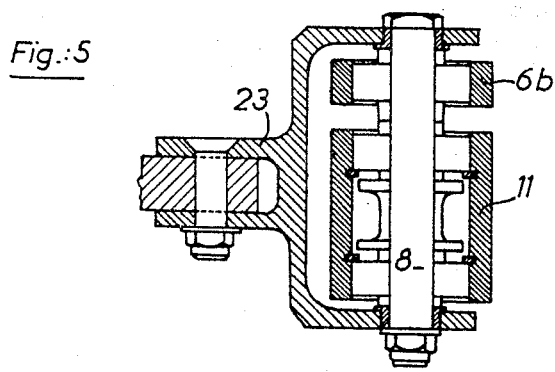
Fig.:5

United States Patent Office 3,426,983
Patented Feb. 11, 1969

1

3,426,983
CONTROL TRANSMISSION DEVICE FOR
VARIABLE-GEOMETRY AIRCRAFT
Henri Deplante, Paris, France, assignor to Avions Marcel
Dassault, Saint-Cloud, Hauts-de-Seine, France, a company of France
Filed Nov. 1, 1967, Ser. No. 679,724
Claims priority, application France, Feb. 1, 1967, 93,370
U.S. Cl. 244—46       7 Claims
Int. Cl. B64c 3/40

ABSTRACT OF THE DISCLOSURE

A mechanical transmission device in a variable-geometry aircraft, comprising an articulated support forming with the wing fulcrum a parallelogram linkage, three bell-cranks mounted on the wing the fuselage and the supports, and coupling rods.

---

The invention relates to variable-geometry aircraft the wings of which can pivot in relation to the fuselage in order to produce different configurations.

In aircraft of this type, the problem arises of so designing the movable elements carried by the wings that the positions of these elements as determined by a control device are substantially unaffected, by the movement of the wings. This is the case in particular with secondary lift flaps which are carried by the wings and which are lowered after speed has been reduced on final approach.

It is desirable that the device controlling these flaps should be such that, if the control device is in the neutral position, i.e. if no lowering of the control flaps has been effected, no appreciable lowering of the control flaps should be produced by an alteration of the configuration of the wings, and that, moreover, when the control flaps have already been lowered, the flap angle should remain substantially unaffected when the wing configuration is altered.

The object of the invention is to provide between the fuselage and the wing a mechanical transmission device which will meet the aforestated requirements.

According to the invention the device comprises an articulated support, which forms together with the wing pivot an articulated parallelogram linkage, and three bell-crank levers connected respectively to the fuselage, the wing and the said articulated support in the immediate vicinity of the points of articulation, the last-said bell-crank lever thus being intermediate of the fuselage bell-crank lever and the wing bell-crank lever, and the three said levers being interconnected by rods.

Preferably, the articulated support is of shear-legs form, the intermediate bell-crank lever having its fulcrum located at the point of articulation of the shear-legs support. Also, preferably, the bell-crank on the wing has its fulcrum on the axis of articulation between the support and the wing, whilst the fulcrum of the bell-crank lever carried by the fuselage is offset in relation to the axis of articulation between the support and the fuselage, but is positioned so that in the neutral position of the control, the point of articulation between said bell-crank lever and the rod linking it to the intermediate bell-crank coincides with the axis of articulation between the support and the fuselage. It is further preferred that the quadrilateral system defined by the point of articulation of the intermediate bell-crank, that of the bell-crank carried by the wing and the points of articulation of the rods connecting them, will form a parallelogram.

Further features and advantages of the invention will emerge from the following description given by way of example only with reference to the accompanying drawings:

In the drawings:

FIGURE 1 illustrates a schematic horizontal projection of an aircraft equipped with a device embodying the invention.

FIGURE 2 illustrates the same device on a larger scale.

FIGURES 3, 4 and 5 are sections through the device of FIGURE 2, on a larger scale, the said sections being taken respectively on the lines III—III, IV—IV and V—V of FIGURE 2.

FIGURES 6 and 7 are diagrams illustrating the operation of the said device.

In FIGURE 1 the plan contour of a variable-geometry aircraft is shown in a highly schematic manner. The aircraft has a fuselage 1 and two wings 2 which can pivot about axes 3 in order to occupy either the deployed position illustrated in full-line or the retracted position illustrated in broken-line.

Fairings 4 are attached to the fuselage on both sides and surround the leading edge of the corresponding wing in the neighbourhood of the fuselage.

Mechanical transmission devices embodying the invention operate the secondary lift flaps. Each device 5 is housed in the neighbourhood of the fuselage 1 behind the corresponding axis 3.

FIGURE 2 to 5 illustrate one of the devices 5 in the neutral position i.e. when the wings are deployed. A support of shear-legs form with two arms 6a and 6b is articulated at 7 to a support 22 integral with one of the fairings 4, and at 8 to a support 23 integral with one of the wings 2, the shape of the fairing 4 and of the wing 2 in the immediate neighbourhood of the device, being shown in broken-lines.

The arms 6a and 6b of the shear-legs support are articulated to one another at 17. The lengths of the arms 6a and 6b are selected such that the quadrilateral arrangement the corners of which coincide with the axis of articulation 3 between the wing and the fuselage, the axis of articulation 7 of the support with the fairing 4, the axis of articulation 17 of the two arms of the support and the axis of articulation 8 between the support and the wing, is of parallelogram form.

Three bell-cranks 9, 10 and 11 are mounted on the fuselage, the articulated support and the wing respectively. The bell-cranks 9 and 10 are linked through a rod 12 and the bell-cranks 10 and 11 through a rod 13.

The bell-crank 9 is articulated at 14 to the support 22 carried by the fairing. It is made to move the flaps (not shown) by means of a rod 15 articulated to it at 16. It will be noted that the axis of articulation 24 between bell-crank 9 and rod 12, is aligned in horizontal projection with the axis of articulation 7 of the shear-legs support with the fairing. The point of articulation between the rod 12 and the intermediate bell-crank 10 is marked 25.

This intermediate bell-crank 10, carried by the shear-legs support, is pivotable about the axis of articulation 17 between the two arms 6a and 6b of the shear-legs support. Similarly, the bell-crank carried by the wing is pivotable about the axis of articulation 8 of the shear-legs support with the wing.

The point of articulation 18 of the rod 13 with the bell-crank 10, and the point of articulation 19 of this same rod with the bell-crank 11, are so selected as to form a parallelogram in conjunction with the points of articulation 8 and 17 of the arm 6b of the support.

The rod 20, articulated at 21 to the bell-crank 11, transmits the control movement to the secondary lift flaps (which are not shown), the transmission of the movement being effected through the medium of the rod 15, the bell-crank 9, the rod 12, the bell-crank 10, the rod 13, the bell-crank 11 and the rod 20.

FIGURE 6 shows the shear-legs support 6a, 6b, the bell-cranks 9, 10, 11, the rods 12, 13, 15 and 20 which transmit the control movement, the points of articulation 7, 8, 17, 19, 21 and 25, and the fulcrum 3 of the wing. The positions of the different components are shown for the condition in which the flaps are in the neutral position, i.e. for the condition in which the point of articulation 7 of the support to the fuselage is in-line with the axis of articulation of the rod 12 with the bell-crank 9.

Due to the coincidence of these two axes, the figure formed by the arm 6a of the support, the rod 12 and the bell-crank 10, remains unchanged when the wing pivots about its fulcrum 3, the said figure or configuration then pivoting about the axis 7. The result is that the angle $a$ determined by the arm 6a of the shear-legs support and the line 17, 18 is invariable.

The quadrilateral arrangement determined by the points 17, 18, 19 and 8 is a parallelogram as is the arrangement determined by the points 3, 7, 17 and 8, so that the angle determined by the lines 3–8 and 8–19 is equal to the angle $a$ and the position of the bell-crank 11 in relation to the line 3–8 is invariable.

The points of articulation 3 and 8 are integral with the wing so that the position of the bell-crank is invariable in relation thereto and, in the neutral position, the pivoting motion of the wing has no effect at all on the flap control system.

FIGURE 7 is similar to FIGURE 6 but shows diagrammatically the different positions of the components corresponding to lowered position of the flaps, where the point of articulation 24 has shifted to 24a corresponding to the flaps down position of the bell-crank 9. To make FIGURE 7 clear, the proportions of the components have been modified in order to enable their different functions to be distinguished. The fully deployed position of the wing has been marked in full-line and a little further away a broken-line marks the position of the wing when retracted slightly. The different components are given the same references as in FIGURE 6, the references having a single prime to indicate the full-line position and a double prime to indicate the broken-line position.

It is advantageous to select the point of articulation 7 of the shear-legs support on the fuselage, in such a way that this point is situated on the bisector of the segment linking the two points of articulation 25' and 25". If this is done, the triangles 7–17'–25' and 7–17"–25" are identical. The position of the bell-crank 10 in relation to the arm 6a of the shear-legs support is thus the same for both the wing positions illustrated. The configurations 8, 17, 18, 19 being a parallelogram, the position of the bell-crank 11 in relation to the wing is identical in both cases. The positions of the flaps are therefore strictly the same for both the wing positions marked respectively in full-line and broken-line.

Advantageously, the point of articulation 7 between the support and the fuselage will be so selected that the flaps-down position is identical when the wings are completely deployed and when they are pivoted through a predetermined angle corresponding to the low-speed positions in which the secondary lift flaps are operated. When the wings are somewhere between these two extremes, the flap position is influenced relatively little by the variation in sweep-back of the wings.

Although the device embodying the invention has been described in relation to flap control it could be used to control any element carried by the wings, without departing from the scope of the invention.

What is claimed is:

1. In a variable-geometry aircraft having a control element carried by the fuselage governing movement of a controlled element mounted on the wing, a mechanical transmission device comprising in combination an articulated support incorporating a first pivotal connection, a second pivotal connection between said support and the fuselage, a third pivotal connection between said support and the wing, thereby to form with the wing fulcrum a parallelogram linkage, three bell-cranks, articulations respectively mounting said bell-cranks on the fuselage, the wing and the support in the vicinity of said second, third and first pivotal connections of the support, a coupling rod linking one arm of the fuselage-mounted bell-crank with one arm of the support-mounted bell-crank, a second coupling rod linking the second arm of the suuport-mounted bell-crank with one arm of the wing-mounted bell-crank, means connecting the second arm of the fuselage-mounted bell-crank to the control element and means connecting the second arm of the wing-mounted bell-crank to the controlled element.

2. A device according to claim 1, wherein the articulated support comprises two legs respective ends of which are articulated by the first pivotal connection.

3. A device according to claim 1, wherein the fulcrum of the support-mounted bell-crank is coincident with the axis of the first pivotal connection.

4. A device according to claim 1, wherein the fulcrum of the wing-mounted bell-crank is coincident with the axis of the third pivotal connection.

5. A device according to claim 1, wherein the fulcrum of the fuselage-mounted bell-crank is offset in relation to the axis of the second pivotal connection, the axis of articulation linking this fuselage-mounted bell-crank to the first coupling rod being coincident, in a predetermined position of the control element, with the axis of the second pivotal connection.

6. A device according to claim 1, wherein the fulcrum of the support-mounted bell-crank, the fulcrum of the wing-mounted bell-crank, and the axes of articulation linking the second coupling rod with these bell-cranks, define a parallelogram linkage.

7. A device as claimed in claim 1 wherein the axis of the second pivotal connection is located substantially on the bisector of the segment defined, between the fully extended wing position and a predetermined neighbouring wing position, by the displacement of the line extending between the axis of articulation of the support-mounted bell-crank with the second coupling rod and the axis of articulation of this red with the wing-mounted bell-crank.

References Cited

UNITED STATES PATENTS

| | | | |
|---|---|---|---|
| 2,665,985 | 1/1954 | Crocombe | 244—49 |
| 3,138,354 | 6/1964 | Baetke | 244—90 |
| 2,670,910 | 3/1954 | Hill et al. | 244—43 |

MILTON BUCHLER, *Primary Examiner.*

R. DORNON, *Assistant Examiner.*

U.S. Cl. X.R.

244—90, 74—469